(12) United States Patent
Pike (10) Patent No.: US 11,010,462 B2
(45) Date of Patent: May 18, 2021

(54) AUTHENTICATION METHODS AND SYSTEMS

(71) Applicants: LICENTIA GROUP LIMITED, South Glamorgan (GB); MYPINPAD LIMITED, South Glamorgan (GB)

(72) Inventor: Justin Pike, Blackwood (GB)

(73) Assignees: LICENTIA GROUP LIMITED, Cardiff (GB); MYPINPAD LIMITED, Cardiff (GB)

( * ) Notice: Subject to any disclaimer, the term of this patent is extended or adjusted under 35 U.S.C. 154(b) by 0 days.

(21) Appl. No.: 15/576,900

(22) PCT Filed: May 27, 2016

(86) PCT No.: PCT/GB2016/051549
§ 371 (c)(1),
(2) Date: Nov. 27, 2017

(87) PCT Pub. No.: WO2016/189323
PCT Pub. Date: Dec. 1, 2016

(65) Prior Publication Data
US 2018/0150623 A1    May 31, 2018

(30) Foreign Application Priority Data

May 27, 2015   (GB) ..................................... 1509030
May 27, 2015   (GB) ..................................... 1509031
(Continued)

(51) Int. Cl.
*H04L 29/06*    (2006.01)
*G06F 21/36*    (2013.01)
(Continued)

(52) U.S. Cl.
CPC ............ *G06F 21/36* (2013.01); *G06F 3/0489* (2013.01); *G06F 3/04886* (2013.01);
(Continued)

(58) Field of Classification Search
CPC ...... G06F 21/36; G06F 3/04886; G06F 7/582; G06F 7/588; G06F 3/0489; G06F 21/32;
(Continued)

(56) References Cited

U.S. PATENT DOCUMENTS

| | | | |
|---|---|---|---|
| 2,819,067 | A | 1/1958 | Dusenbury |
| 3,176,324 | A | 4/1965 | Birgbauer, Sr. |

(Continued)

FOREIGN PATENT DOCUMENTS

| | | | |
|---|---|---|---|
| CN | 100583113 | C | 3/2005 |
| CN | 101082948 | A | 12/2007 |

(Continued)

OTHER PUBLICATIONS https://patentscope.wipo.int/search/en/detail.jsf?docId=WO2011116570&tab=PCTBIBLIO&maxRec=1000 (Year: 2010).*
(Continued)

*Primary Examiner* — Carl G Colin
*Assistant Examiner* — Hany S. Gadalla
(74) *Attorney, Agent, or Firm* — Gordon & Jacobson, P.C.

(57) ABSTRACT

The invention provides an authentication method and system. It is particularly suited for verifying the identity of an individual prior to permitting access to a controlled resource. This may or may not be a financial resource. The invention uses biometric data relating to a user to encode and decode an identifier associated with a user. Thus the user's biometric data becomes the key for encoding and subsequently decoding the identifier. In one embodiment, the biometric data is used to generate a keypad configuration.
(Continued)

The keypad configuration specifies the order and/or position of a plurality of keypad keys. An operable keypad and/or image of a keypad is then generated using the configuration. Thus, the individual's biometric data can be used to generate a customised keypad and/or image which can then be used to encode or decode the identifier associated with the user. A keypad or image generated from the biometric data can be used to generate a mapping between different keypad configurations. The biometric data may be captured at or on a device associated with the individual, such as a computer, mobile phone, tablet computer etc.

19 Claims, 4 Drawing Sheets

(30) Foreign Application Priority Data

Nov. 24, 2015 (GB) .................................. 1520741
Nov. 24, 2015 (GB) .................................. 1520760

(51) Int. Cl.
| | |
|---|---|
| G06Q 20/32 | (2012.01) |
| G06Q 20/40 | (2012.01) |
| G07F 7/10 | (2006.01) |
| G06F 21/32 | (2013.01) |
| G06Q 20/20 | (2012.01) |
| G06F 3/0488 | (2013.01) |
| G06F 3/0489 | (2013.01) |
| G06Q 20/10 | (2012.01) |
| G06F 7/58 | (2006.01) |
| G06Q 20/38 | (2012.01) |
| H04L 9/08 | (2006.01) |
| G06Q 20/36 | (2012.01) |

(52) U.S. Cl.
CPC ......... *G06F 21/32* (2013.01); *G06Q 20/1085* (2013.01); *G06Q 20/206* (2013.01); *G06Q 20/32* (2013.01); *G06Q 20/3226* (2013.01); *G06Q 20/4012* (2013.01); *G06Q 20/4014* (2013.01); *G06Q 20/40145* (2013.01); *G07F 7/1033* (2013.01); *G07F 7/1041* (2013.01); *G07F 7/1075* (2013.01); *G07F 7/1091* (2013.01); *G06F 7/582* (2013.01); *G06F 7/588* (2013.01); *G06Q 20/36* (2013.01); *G06Q 20/3829* (2013.01); *G06Q 2220/00* (2013.01); *H04L 9/0866* (2013.01); *H04L 2209/08* (2013.01)

(58) Field of Classification Search
CPC .... G07F 7/1091; G07F 7/1075; G07F 7/1041; G07F 7/1033; H04L 2209/08; H04L 9/0866; H04L 9/3231; G06Q 20/36; G06Q 20/1085; G06Q 20/4012; G06Q 20/206; G06Q 20/40145; G06Q 20/4014; G06Q 20/3226; G06Q 20/32; G06Q 20/3829; G06Q 2220/00

See application file for complete search history.

(56) References Cited

U.S. PATENT DOCUMENTS

| | | | |
|---|---|---|---|
| 3,201,732 A | 8/1965 | Olsen | |
| 3,255,323 A | 6/1966 | Austin | |
| 3,270,720 A | 9/1966 | Ehrhardt | |
| 3,347,103 A | 10/1967 | High | |
| 3,364,601 A | 1/1968 | Korenek | |
| 3,375,428 A | 3/1968 | Mitchell | |
| 3,392,846 A | 7/1968 | Getzin | |
| 3,413,071 A | 11/1968 | Davis | |
| 3,621,242 A | 11/1971 | Ferguson | |
| 3,762,876 A | 10/1973 | Koehler | |
| 3,965,066 A | 6/1976 | Sterman | |
| 5,193,152 A | 3/1993 | Smith | |
| 5,209,102 A | 5/1993 | Wang | |
| 5,234,389 A | 8/1993 | Goates | |
| 5,257,486 A | 11/1993 | Holmwall | |
| 5,363,449 A | 11/1994 | Bestock | |
| 5,434,702 A | 7/1995 | Byron | |
| 5,504,808 A | 4/1996 | Hamrick, Jr. | |
| 5,549,194 A | 8/1996 | Dag | |
| 5,715,078 A | 2/1998 | Shiraishi | |
| 5,754,652 A | 5/1998 | Wilfong | |
| 5,949,348 A | 9/1999 | Kapp | |
| 5,990,586 A | 11/1999 | Milano, Jr. | |
| 6,193,152 B1 | 2/2001 | Fernando | |
| 6,209,102 B1 | 3/2001 | Hoover | |
| 6,219,794 B1 | 4/2001 | Soutar | |
| 6,234,389 B1 | 5/2001 | Valliani | |
| 6,257,486 B1 | 7/2001 | Teicher | |
| 6,434,702 B1 | 8/2002 | Maddalozzo, Jr. | |
| 6,549,194 B1 | 4/2003 | McIntyre | |
| 6,630,928 B1 | 10/2003 | McIntyre | |
| 6,671,405 B1 | 12/2003 | Savakis | |
| 6,715,078 B1 | 3/2004 | Chasko | |
| 6,990,586 B1 | 1/2006 | Tresser | |
| 7,003,316 B1 | 2/2006 | Elias | |
| 7,010,806 B2 | 3/2006 | Bender | |
| 7,047,222 B1 | 5/2006 | Bush | |
| 7,091,845 B2 | 8/2006 | Midland | |
| 7,092,915 B2 | 8/2006 | Best | |
| 7,243,237 B2 | 7/2007 | Peinado | |
| 7,305,565 B1 | 12/2007 | Lungaro | |
| 7,395,506 B2 | 7/2008 | Tan | |
| 7,698,563 B2 | 4/2010 | Shin | |
| 7,735,121 B2 | 6/2010 | Madani | |
| 7,992,007 B2 | 8/2011 | Lazzaro | |
| 8,117,458 B2 | 2/2012 | Osborn, III | |
| 8,176,324 B1 | 5/2012 | Krishnamurthy | |
| 8,201,732 B1 | 6/2012 | Kropf | |
| 8,255,323 B1 | 8/2012 | Casey | |
| 8,270,720 B1 | 9/2012 | Ladd | |
| 8,297,173 B1 | 10/2012 | Teetzel | |
| 8,347,103 B2 | 1/2013 | Jones | |
| 8,364,601 B2 | 1/2013 | Dewan | |
| 8,375,428 B2 | 2/2013 | Won | |
| 8,392,846 B2 | 3/2013 | Carapelli | |
| 8,413,071 B2 | 4/2013 | Kim | |
| 8,453,027 B2 | 5/2013 | Bartz | |
| 8,453,207 B1 | 5/2013 | White | |
| 8,621,242 B2 | 12/2013 | Brown | |
| 8,762,876 B2 | 6/2014 | Puppin | |
| 8,965,066 B1 * | 2/2015 | Derakhshani | H04L 9/14 382/117 |
| 9,082,253 B1 | 7/2015 | Harty | |
| 9,235,967 B1 | 1/2016 | Magee | |
| 9,552,465 B2 | 1/2017 | Pike | |
| 9,576,411 B2 | 2/2017 | Kim | |
| 10,108,796 B2 * | 10/2018 | Lo | G06F 3/013 |
| 10,366,215 B2 | 7/2019 | Pike | |
| 2002/0016918 A1 | 2/2002 | Tucker | |
| 2002/0023215 A1 | 2/2002 | Wang | |
| 2002/0029342 A1 | 3/2002 | Keech | |
| 2002/0046185 A1 | 4/2002 | Villart | |
| 2002/0082962 A1 | 6/2002 | Farris | |
| 2002/0012397 A1 | 9/2002 | Hodgson | |
| 2002/0129250 A1 | 9/2002 | Kimura | |
| 2002/0188872 A1 | 12/2002 | Willeby | |
| 2003/0002667 A1 | 1/2003 | Gougeon | |
| 2003/0004877 A1 | 1/2003 | Kasasaku | |
| 2003/0120612 A1 | 6/2003 | Fujisawa | |
| 2003/0120936 A1 | 6/2003 | Farris | |
| 2003/0132918 A1 | 7/2003 | Fitch | |
| 2003/0212327 A1 | 11/2003 | Wang | |
| 2003/0229597 A1 | 12/2003 | De Jong | |
| 2003/0229598 A1 | 12/2003 | De Jong | |
| 2003/0229791 A1 | 12/2003 | De Jong | |

(56) References Cited

U.S. PATENT DOCUMENTS

| | | | |
|---|---|---|---|
| 2004/0010690 A1 | 1/2004 | Shin | |
| 2004/0039933 A1 | 2/2004 | Martin | |
| 2004/0044739 A1 | 3/2004 | Ziegler | |
| 2004/0073809 A1 | 4/2004 | Wing Keong | |
| 2004/0122768 A1 | 6/2004 | Creamer | |
| 2004/0122771 A1 | 6/2004 | Celi | |
| 2004/0182921 A1 | 9/2004 | Dickson | |
| 2005/0010786 A1 | 1/2005 | Michener | |
| 2005/0012715 A1 | 1/2005 | Ford | |
| 2005/0036611 A1 | 2/2005 | Seaton | |
| 2005/0043997 A1 | 2/2005 | Sahota | |
| 2005/0075973 A1 | 4/2005 | Yousofi | |
| 2005/0127156 A1 | 6/2005 | Yoo | |
| 2005/0127158 A1 | 6/2005 | Figueras | |
| 2005/0140832 A1 | 6/2005 | Goldman | |
| 2005/0144449 A1 | 6/2005 | Voice | |
| 2005/0146447 A1 | 7/2005 | Na | |
| 2005/0177522 A1 | 8/2005 | Williams | |
| 2005/0193208 A1 | 9/2005 | Charrette, III | |
| 2005/0212763 A1 | 9/2005 | Okamura | |
| 2006/0003706 A1 | 1/2006 | Welland | |
| 2006/0017691 A1 | 1/2006 | Cruz-Hernandez | |
| 2006/0018467 A1 | 1/2006 | Steinmetz | |
| 2006/0026440 A1 | 2/2006 | Sauvebois | |
| 2006/0032705 A1 | 2/2006 | Isham | |
| 2006/0037067 A1 | 2/2006 | Morris | |
| 2006/0053301 A1 | 3/2006 | Shin | |
| 2006/0104446 A1 | 5/2006 | Varghese | |
| 2006/0133597 A1 | 6/2006 | Song | |
| 2006/0136334 A1 | 6/2006 | Atkinson | |
| 2006/0146169 A1 | 7/2006 | Segman | |
| 2006/0149845 A1 | 7/2006 | Malin | |
| 2006/0155619 A1 | 7/2006 | Rhiando | |
| 2006/0182715 A1 | 8/2006 | Sandrock | |
| 2006/0206919 A1 | 9/2006 | Montgomery | |
| 2006/0221059 A1 | 10/2006 | Choi | |
| 2006/0247533 A1 | 11/2006 | Abe | |
| 2007/0005500 A1 | 1/2007 | Steeves | |
| 2007/0011466 A1* | 1/2007 | Imura | G07C 9/37 713/186 |
| 2007/0014415 A1 | 1/2007 | Harrison | |
| 2007/0073937 A1 | 3/2007 | Feinberg | |
| 2007/0089164 A1 | 4/2007 | Gao | |
| 2007/0101150 A1 | 5/2007 | Oda | |
| 2007/0110224 A1 | 5/2007 | Gumpel | |
| 2007/0182715 A1 | 8/2007 | Fyke | |
| 2007/0209014 A1 | 9/2007 | Youmtoub | |
| 2007/0213090 A1* | 9/2007 | Holmberg | G06F 3/04886 455/550.1 |
| 2007/0279391 A1 | 12/2007 | Marttila | |
| 2007/0282756 A1 | 12/2007 | Dravenstott | |
| 2008/0011098 A1 | 1/2008 | Herremans | |
| 2008/0014818 A1 | 1/2008 | Privitera | |
| 2008/0110981 A1 | 5/2008 | Deline | |
| 2008/0148186 A1 | 6/2008 | Krishnamurthy | |
| 2008/0165035 A1* | 7/2008 | Bhella | G06F 3/0238 341/23 |
| 2008/0168546 A1 | 7/2008 | Almeida | |
| 2008/0172735 A1 | 7/2008 | Gao | |
| 2008/0184036 A1* | 7/2008 | Kavsan | G06F 21/36 713/184 |
| 2008/0209223 A1 | 8/2008 | Nandy | |
| 2008/0251969 A1 | 10/2008 | Isham | |
| 2008/0280652 A1 | 11/2008 | Marry | |
| 2008/0289035 A1 | 11/2008 | Delia | |
| 2008/0306995 A1 | 12/2008 | Newell | |
| 2008/0319902 A1 | 12/2008 | Chazan | |
| 2009/0033522 A1 | 2/2009 | Skillman | |
| 2009/0044282 A1 | 2/2009 | Govindaraju | |
| 2009/0066660 A1 | 3/2009 | Ure | |
| 2009/0067627 A1 | 3/2009 | Hogl | |
| 2009/0077383 A1 | 3/2009 | De Monseignat | |
| 2009/0106827 A1 | 4/2009 | Cerruti | |
| 2009/0183098 A1 | 7/2009 | Casparian et al. | |
| 2009/0193210 A1 | 7/2009 | Hewett | |
| 2009/0213132 A1 | 8/2009 | Kargman | |
| 2009/0235199 A1 | 9/2009 | Mastie | |
| 2009/0254986 A1 | 10/2009 | Harris | |
| 2009/0270078 A1 | 10/2009 | Nam | |
| 2009/0277968 A1 | 11/2009 | Walker | |
| 2009/0328197 A1* | 12/2009 | Newell | G06F 21/36 726/18 |
| 2010/0036783 A1 | 2/2010 | Rodriguez | |
| 2010/0049768 A1 | 2/2010 | Robert | |
| 2010/0098300 A1 | 4/2010 | Otto | |
| 2010/0109920 A1* | 5/2010 | Spradling | G06F 21/36 341/23 |
| 2010/0117792 A1 | 5/2010 | Faith | |
| 2010/0121737 A1 | 5/2010 | Yoshida | |
| 2010/0125509 A1 | 5/2010 | Kranzley | |
| 2010/0138666 A1 | 6/2010 | Adams | |
| 2010/0149100 A1 | 6/2010 | Meiby | |
| 2010/0153270 A1 | 6/2010 | Hawkes | |
| 2010/0174653 A1 | 7/2010 | Tian | |
| 2010/0175016 A1 | 7/2010 | Tian | |
| 2010/0180336 A1 | 7/2010 | Jones | |
| 2010/0182244 A1 | 7/2010 | Onda | |
| 2010/0186076 A1 | 7/2010 | Ali | |
| 2010/0215270 A1 | 8/2010 | Manohar | |
| 2010/0223663 A1* | 9/2010 | Morimoto | G06F 21/32 726/7 |
| 2010/0242104 A1 | 9/2010 | Wankmueller | |
| 2010/0259561 A1 | 10/2010 | Forutanpour et al. | |
| 2010/0287097 A1 | 11/2010 | Treadwell | |
| 2010/0287382 A1 | 11/2010 | Gyorffy | |
| 2010/0306283 A1 | 12/2010 | Johnson | |
| 2010/0323617 A1 | 12/2010 | Hubinak | |
| 2011/0004769 A1 | 1/2011 | Won | |
| 2011/0018033 A1 | 1/2011 | Takenaka | |
| 2011/0020414 A1 | 1/2011 | Kunin | |
| 2011/0055084 A1 | 3/2011 | Singh | |
| 2011/0090097 A1 | 4/2011 | Beshke | |
| 2011/0109567 A1 | 5/2011 | Kim | |
| 2011/0144586 A1 | 6/2011 | Michaud | |
| 2011/0180336 A1 | 7/2011 | Kurata | |
| 2011/0185313 A1* | 7/2011 | Harpaz | G06F 3/0482 715/826 |
| 2011/0185319 A1 | 7/2011 | Carapelli | |
| 2011/0191591 A1 | 8/2011 | Cheng | |
| 2011/0191856 A1 | 8/2011 | Keen | |
| 2011/0199387 A1 | 8/2011 | Newton | |
| 2011/0204140 A1 | 8/2011 | Hart | |
| 2011/0246369 A1 | 10/2011 | De Oliveira | |
| 2011/0281630 A1 | 11/2011 | Omar | |
| 2011/0310019 A1* | 12/2011 | Wilson | G06F 3/0238 345/168 |
| 2011/0313871 A1 | 12/2011 | Greenwood | |
| 2011/0321138 A1 | 12/2011 | Kruger | |
| 2012/0042365 A1 | 2/2012 | Shoval | |
| 2012/0047564 A1 | 2/2012 | Liu | |
| 2012/0079273 A1* | 3/2012 | Bacchiaz | G07C 9/00087 713/168 |
| 2012/0095867 A1 | 4/2012 | Mckelvey | |
| 2012/0096277 A1 | 4/2012 | Perez Soria | |
| 2012/0098750 A1 | 4/2012 | Allen | |
| 2012/0132705 A1 | 5/2012 | Golueke Peter | |
| 2012/0158672 A1 | 6/2012 | Oltean | |
| 2012/0159160 A1 | 6/2012 | Poisner | |
| 2012/0159582 A1 | 6/2012 | Griffin | |
| 2012/0159583 A1 | 6/2012 | Griffin | |
| 2012/0159592 A1 | 6/2012 | Griffin | |
| 2012/0159593 A1 | 6/2012 | Griffin | |
| 2012/0159594 A1 | 6/2012 | Griffin | |
| 2012/0159609 A1 | 6/2012 | Griffin | |
| 2012/0159613 A1 | 6/2012 | Griffin | |
| 2012/0159614 A1 | 6/2012 | Griffin | |
| 2012/0159616 A1 | 6/2012 | Griffin | |
| 2012/0162086 A1 | 6/2012 | Rhee | |
| 2012/0185398 A1 | 7/2012 | Weis | |
| 2012/0222100 A1 | 8/2012 | Fisk | |
| 2012/0222102 A1 | 8/2012 | Hirose | |
| 2012/0249295 A1 | 10/2012 | Yeung | |
| 2012/0253971 A1 | 10/2012 | Bansal | |
| 2012/0256723 A1 | 10/2012 | Grover | |

(56) References Cited

U.S. PATENT DOCUMENTS

| | | |
|---|---|---|
| 2012/0260326 A1 | 10/2012 | Steigmann |
| 2012/0291120 A1 | 11/2012 | Griffin |
| 2012/0305648 A1 | 12/2012 | Sondhi |
| 2012/0311723 A1 | 12/2012 | Britt, Jr. |
| 2012/0313858 A1 | 12/2012 | Park |
| 2012/0323788 A1 | 12/2012 | Keresman, III |
| 2013/0018800 A1 | 1/2013 | Devaraju |
| 2013/0019320 A1 | 1/2013 | Ericsson |
| 2013/0020389 A1 | 1/2013 | Barnett |
| 2013/0021233 A1 | 1/2013 | Umminger |
| 2013/0023240 A1 | 1/2013 | Weiner |
| 2013/0026513 A1 | 1/2013 | Aurongzeb |
| 2013/0029824 A1 | 1/2013 | De Koning |
| 2013/0042318 A1 | 2/2013 | Thatha |
| 2013/0047237 A1 | 2/2013 | Ahn |
| 2013/0050088 A1 | 2/2013 | Smith |
| 2013/0060739 A1 | 3/2013 | Kalach |
| 2013/0078951 A1 | 3/2013 | Mun |
| 2013/0086382 A1 | 4/2013 | Barnett |
| 2013/0091583 A1 | 4/2013 | Karroumi |
| 2013/0106690 A1 | 5/2013 | Lim |
| 2013/0117573 A1 | 5/2013 | Harbige |
| 2013/0148044 A1 | 6/2013 | Ohyama |
| 2013/0154937 A1* | 6/2013 | Park .................. G06F 3/023 345/168 |
| 2013/0154981 A1 | 6/2013 | Park |
| 2013/0198459 A1 | 8/2013 | Joshi |
| 2013/0207902 A1 | 8/2013 | Showering |
| 2013/0232549 A1 | 9/2013 | Hawkes |
| 2013/0265136 A1 | 10/2013 | Wadia |
| 2013/0298246 A1 | 11/2013 | Cragun |
| 2013/0301830 A1 | 11/2013 | Bar-El |
| 2014/0002558 A1 | 1/2014 | Ramesh |
| 2014/0013252 A1 | 1/2014 | Ehrler |
| 2014/0025580 A1 | 1/2014 | Bacastow |
| 2014/0096201 A1 | 4/2014 | Gupta |
| 2014/0162598 A1* | 6/2014 | Villa-Real ............. H04M 1/66 455/411 |
| 2014/0168083 A1 | 6/2014 | Ellard |
| 2014/0173492 A1 | 6/2014 | Yoon |
| 2014/0195429 A1 | 7/2014 | Paulsen |
| 2014/0281995 A1* | 9/2014 | Kim .................. G06F 3/04883 715/719 |
| 2014/0283022 A1 | 9/2014 | Beloncik |
| 2014/0310531 A1 | 10/2014 | Kundu |
| 2014/0324698 A1 | 10/2014 | Dolcino |
| 2014/0324708 A1 | 10/2014 | McCauley |
| 2015/0095241 A1 | 4/2015 | Edwards |
| 2015/0116225 A1 | 4/2015 | Luo |
| 2015/0154414 A1 | 6/2015 | Pike |
| 2015/0154598 A1 | 6/2015 | Forte |
| 2015/0261968 A1 | 9/2015 | Polyachenko |
| 2015/0332038 A1* | 11/2015 | Ramsden ............. G06F 21/32 726/19 |
| 2015/0347774 A1 | 12/2015 | Krstic |
| 2015/0350163 A1 | 12/2015 | Brander |
| 2015/0371213 A1 | 12/2015 | Pike |
| 2015/0379288 A1 | 12/2015 | Kubik |
| 2016/0005150 A1* | 1/2016 | Ghassabian ......... G06F 3/04886 345/654 |
| 2016/0006718 A1 | 1/2016 | Huxham |
| 2016/0034718 A1 | 2/2016 | Mizrachi |
| 2016/0042190 A1 | 2/2016 | Adderly |
| 2016/0063230 A1 | 3/2016 | Alten |
| 2016/0065546 A1 | 3/2016 | Krishna |
| 2016/0125193 A1 | 5/2016 | Dai Zovi |
| 2016/0154980 A1 | 6/2016 | Neumann |
| 2016/0224771 A1* | 8/2016 | Pike .................... G06F 21/31 |
| 2016/0246955 A1* | 8/2016 | Jiang ................... G06F 21/32 |
| 2016/0253508 A1 | 9/2016 | Song |
| 2016/0283013 A1 | 9/2016 | Engstrom |
| 2016/0314293 A1 | 10/2016 | Pike |
| 2016/0314468 A1* | 10/2016 | Smith ................. G07F 7/1041 |
| 2016/0320965 A1 | 11/2016 | Chung |
| 2016/0337857 A1 | 11/2016 | Carron |
| 2017/0006140 A1 | 1/2017 | Park |
| 2017/0061138 A1 | 3/2017 | Lambert |
| 2017/0061408 A1 | 3/2017 | Choi |
| 2017/0140354 A1 | 5/2017 | Jenkins |
| 2017/0192670 A1 | 7/2017 | Raman |
| 2017/0235926 A1 | 8/2017 | Fyke |
| 2017/0270764 A1 | 9/2017 | Riedel |
| 2018/0032831 A1 | 2/2018 | Kim |
| 2018/0150623 A1 | 5/2018 | Pike |
| 2018/0150628 A1 | 5/2018 | Pike |
| 2018/0150629 A1 | 5/2018 | Pike |
| 2018/0150630 A1 | 5/2018 | Pike |
| 2018/0374392 A1 | 12/2018 | Ollivier |
| 2020/0005273 A1 | 1/2020 | Pike |
| 2020/0201960 A1 | 6/2020 | Pike |
| 2020/0210557 A1 | 7/2020 | Pike |
| 2020/0226235 A1 | 7/2020 | Pike |

FOREIGN PATENT DOCUMENTS

| | | |
|---|---|---|
| CN | 101126967 A | 2/2008 |
| CN | 201035502 Y | 3/2008 |
| CN | 201111222 Y | 9/2008 |
| CN | 202150070 U | 2/2012 |
| CN | 105956857 A | 9/2016 |
| CN | 106022172 A | 10/2016 |
| DE | 4129202 | 3/1993 |
| DE | 4129202 A1 | 3/1993 |
| DE | 19803339 A1 | 8/1999 |
| DE | 10100188 | 7/2002 |
| DE | 10306352 A1 | 9/2004 |
| DE | 102008050609 A1 | 10/2009 |
| DE | 102008056605 A1 | 5/2010 |
| DE | 102009022845 | 9/2010 |
| DE | 102009022845 A1 | 9/2010 |
| DE | 102009023925 A1 | 12/2010 |
| DE | 102010022368 A1 | 12/2011 |
| EP | 0432409 A1 | 6/1991 |
| EP | 0662665 A2 | 7/1995 |
| EP | 0870222 A2 | 10/1998 |
| EP | 1161060 | 12/2001 |
| EP | 1161060 A1 | 12/2001 |
| EP | 1599786 A2 | 11/2005 |
| EP | 1600847 A1 | 11/2005 |
| EP | 1615181 A1 | 1/2006 |
| EP | 1742450 | 1/2007 |
| EP | 1840778 A1 | 10/2007 |
| EP | 2141647 | 1/2010 |
| EP | 2141647 A1 | 1/2010 |
| EP | 2365469 | 9/2011 |
| EP | 2400426 A1 | 12/2011 |
| EP | 2458491 | 5/2012 |
| EP | 2458491 A2 | 5/2012 |
| EP | 2466512 A1 | 6/2012 |
| EP | 2466513 A1 | 6/2012 |
| EP | 2466514 A1 | 6/2012 |
| EP | 2466515 A1 | 6/2012 |
| EP | 2466516 A1 | 6/2012 |
| EP | 2466517 A1 | 6/2012 |
| EP | 2466518 A1 | 6/2012 |
| EP | 2466519 A1 | 6/2012 |
| EP | 2466520 A1 | 6/2012 |
| EP | 2466521 A1 | 6/2012 |
| EP | 2487620 A1 | 8/2012 |
| EP | 2512090 A1 | 10/2012 |
| EP | 2523137 A1 | 11/2012 |
| EP | 2775421 | 9/2014 |
| EP | 3163926 A1 | 5/2017 |
| EP | 3176722 A1 | 6/2017 |
| EP | 3355512 A1 | 8/2018 |
| FR | 2622322 | 4/1989 |
| FR | 2810067 | 12/2001 |
| FR | 2812423 A1 | 2/2002 |
| FR | 2819067 | 7/2002 |
| FR | 2923034 A1 | 5/2009 |
| FR | 2961330 A1 | 12/2011 |
| FR | 2969342 A1 | 6/2012 |
| GB | 2387702 A | 10/2003 |

(56) References Cited

FOREIGN PATENT DOCUMENTS

| | | |
|---|---|---|
| GB | 2388229 A | 11/2003 |
| GB | 2389693 A | 12/2003 |
| GB | 2402649 A | 12/2004 |
| GB | 2416058 | 1/2006 |
| GB | 2416058 A | 1/2006 |
| GB | 2427059 A | 12/2006 |
| GB | 2438886 A | 12/2007 |
| GB | 2454459 A | 5/2009 |
| GB | 2457733 | 8/2009 |
| GB | 2457733 A | 8/2009 |
| GB | 2520207 A | 5/2015 |
| GB | 2542512 | 3/2017 |
| GB | 2556474 | 5/2018 |
| JP | 1995271884 | 10/1995 |
| JP | 2000099801 A | 4/2000 |
| JP | 2000165378 | 6/2000 |
| JP | 2003346098 | 12/2003 |
| JP | 2003346098 A | 12/2003 |
| JP | 2004102460 | 4/2004 |
| JP | 2005107678 | 4/2005 |
| JP | 2006243938 A | 9/2006 |
| JP | 2008506198 | 2/2008 |
| JP | 2008204409 A | 9/2008 |
| JP | 2008537210 | 9/2008 |
| JP | 2009199581 A | 9/2009 |
| JP | 2009237774 A | 10/2009 |
| JP | 2010126913 A | 6/2010 |
| JP | 2010533925 | 10/2010 |
| JP | 2012138011 A | 7/2012 |
| JP | 2012194648 A | 10/2012 |
| KR | 20090130455 A | 12/2009 |
| KR | 101520803 | 5/2015 |
| KR | 20180056116 A | 5/2018 |
| WO | 9311551 | 6/1993 |
| WO | 9705578 | 2/1997 |
| WO | 0025474 A1 | 5/2000 |
| WO | 0146922 | 6/2001 |
| WO | 0146922 A1 | 6/2001 |
| WO | 02071177 A2 | 9/2002 |
| WO | 03058947 | 7/2003 |
| WO | 03058947 A1 | 7/2003 |
| WO | 03058947 A2 | 7/2003 |
| WO | 2005104428 | 11/2005 |
| WO | 2005104428 A2 | 11/2005 |
| WO | 2006010058 | 1/2006 |
| WO | WO2006/064241 A2 | 6/2006 |
| WO | 2006095203 | 9/2006 |
| WO | 2007056746 | 5/2007 |
| WO | 2007143740 | 12/2007 |
| WO | 2007143740 A2 | 12/2007 |
| WO | 2009000223 A2 | 12/2008 |
| WO | 2009009788 | 1/2009 |
| WO | 2009009788 A1 | 1/2009 |
| WO | 2009012326 | 1/2009 |
| WO | 2009130985 | 10/2009 |
| WO | 2010131218 | 11/2010 |
| WO | 2010131218 A1 | 11/2010 |
| WO | 2010134808 | 11/2010 |
| WO | 2011093098 A1 | 8/2011 |
| WO | 2011155915 | 12/2011 |
| WO | 2011155915 A1 | 12/2011 |
| WO | 12009334 A1 | 1/2012 |
| WO | 2012004395 A1 | 1/2012 |
| WO | 2012077098 A1 | 6/2012 |
| WO | 2012131420 A1 | 10/2012 |
| WO | 2012146587 A1 | 11/2012 |
| WO | 2013013192 | 1/2013 |
| WO | 2013021233 | 2/2013 |
| WO | 2013148044 | 10/2013 |
| WO | WO2014/013252 A2 | 1/2014 |
| WO | 2014111689 A1 | 7/2014 |
| WO | 2014132193 | 9/2014 |
| WO | 2015055973 | 4/2015 |
| WO | 2015063474 | 5/2015 |
| WO | 2016046458 A1 | 3/2016 |
| WO | WO-2016048236 A1 * | 3/2016 ............ G06F 21/31 |
| WO | 2016189325 A1 | 12/2016 |
| WO | 2017065576 A1 | 4/2017 |
| WO | 2017190561 A1 | 11/2017 |

OTHER PUBLICATIONS https://patentscope.wipo.int/search/en/detail.jsf?docId=WO2016188127&tab=PCTBIBLIO&maxRec=1000 (Year: 2015).*
Fujitsu Develops World's First Authentication Technology to Extract and match 2,048-bit Feataure Codes from Palm Vein Images, Anonymous, Fujitsu Global, (Aug. 5, 2013), Retrieved from internet URL:http://www.fujitsu.com/global/about/resources/news/press-releases/2013/0805-01.html.
Using Biometrics to Generate Public and Private Keys, Satrugna Pakala, (May 31, 2006) Retrieved from internet; URL: http://www.sci.tamucc.edu/~cams/GraduateProjects/view.php?view=266.
Examination Report of Indian Application No. 2301/KOLNP/2015 dated Oct. 18, 2019.
Decision to Grant for related GB2520207.
Examination Report of Application No. GB1619853.3 dated Mar. 8, 2017.
https://patentscope.wipo.int/search/en/detail.jsf?docId=W02016188127&tab=PCTBI BLIO&maxRec=1 000 (Year:2015).
International Search Report and Written Opinion of International Application No. PCT/GB2016/051548 dated Aug. 8, 2016.
International Search Report and Written Opinion of International Application No. PCT/GB2016/051549 dated Aug. 10, 2016.
International Search Report and Written Opinion of International Application No. PCT/GB2016/051550 dated Aug. 8, 2016.
International Search Report and Written Opinion of International Application No. PCT/GB2016/051553 dated Aug. 4, 2016.
International Search Report in related PCT Application No. PCT/GB2013/051913 dated Feb. 6, 2014.
Roos, "Automatically Downloading My ING Direct Transactions—Chris Roos", Jun. 23, 2007, XP055085833.
Search and Examination Report of Application No. GB1906165.4 dated Aug. 23, 2019.
Search Report in related GB Application No. GB1212878.1 dated Dec. 3, 2012.
Search Report issued by United Kingdom Intellectual Property Office dated Oct. 6, 2017 for Application No. GB1321505.8.
The Usability of Picture Passwords, Fraser, Jul. 23, 2014.
Written Opinion of the Intl Searching Authority in related PCT Application No. PCT/GB2013/051913, 201, dated Jan. 20, 2015.
Search Report cited in Office Action dated Nov. 26, 2019 of Russian Application No. 2017141194/08.
Translation of Office Action dated Nov. 26, 2019 of Russian Application No. 2017141194/08.
CIPHERCARD: A Token-Based Approach Against Camera-Based Shoulder Surfing Attacks on Common Touchscreen Devices Authors: Teddy Seyed; Xing-Dong Yang; Anthony Tang; Saul Greenberg; Jiawei Gubin; Zhuxiang Cao.
Japanese Office Action dated Sep. 8, 2020 of application No. 2017-561754.
Scramblepad, Scrambleprox, Scramblesmart, Scramblesmartprox Author: Hirsch Electronics Date: Jul. 27, 2013.
Search Report dated Jul. 22, 2020 of GB application No. GB1916441.7, 2 pages.
Touch Screen Remote Arming Station (RAS) Author: Tecom Date: Mar. 18, 2015.
EyeDecrypt—Private Interactions in plain Sight, Forte et al., Proc. 9th Conference on Security and Cryptography for Networks (SCN 2014).
GlobalPlatform Device Technology Trusted User Interface API, Version 1.0, Jun. 2013, Document Reference: GPD_SPE_020.
PCI Mobile Payment Acceptance Security Guidelines for Developers, Version 1.0, Emerging Technologies, PCI Security Standards Council, Sep. 2012.
PCI Mobile Payment Acceptance Security Guidelines for Merchants as End-Users, Version 1.0, Emerging Technologies, PCI Security Standards Council, Feb. 2013.

(56) References Cited

OTHER PUBLICATIONS

Secure Mobile Payment on NFC-Enabled Mobile Phones Formally Analysed Using CasperFDR, S. Abughazalah et al, 2014 IEEE 13th International Conference on Trust, Security and Privacy in Computing and Communications, pp. 422-431.
Thales e-Security mPOS Secure Mobile Card Acceptance White Paper, Nov. 2013.
Chinese Office Action dated Dec. 3, 2020 of Application No. 201680039203.9.
Australian Office Action dated Jan. 18, 2021 of application No. 2016269268.
Indian Office Action dated Feb. 1, 2021 of application No. 20173704209.
Indian Office Action dated Jan. 21, 2021 of application No. 201737042169.

\* cited by examiner

AUTHENTICATION METHODS AND SYSTEMS

CROSS-REFERENCE TO RELATED APPLICATIONS

This application is the national stage of International Patent Application No. PCT/GB2016/051549 filed on May 27, 2016, and which claims priority to British Patent Applications Nos. GB 1509030.1 filed on May 27, 2015, GB 1509031.9 filed on May 27, 2015, GB 1520760.8 filed on Nov. 24, 2015 and GB 1520741.8 filed on Nov. 24, 2015, all of which are hereby incorporated by reference in their entireties as if fully set forth herein.

BACKGROUND

1. Field

This invention relates generally to authentication (verification) of an individual prior to permitting access to a controlled resource or service, and more particularly to biometric authentication. The invention is particularly suited, but not limited to, use in verification of an individual's identity prior to performing a financial transaction.

2. Related Art

Authentication methods and techniques are well known. Such techniques include the use of an identifier, such as a PIN or code, which is stored in association with a user. The user is required to supply the correct PIN before being granted access to a controlled resource (eg bank account) or service. The use of PINs has become widely accepted in the banking industry and customers are familiar and comfortable with their use.

Biometric data has also been explored for use with authentication solutions. Biometric data relates to physical or behavioural characteristics of an individual, and can thus be used to uniquely identify that individual. Biometric data may relate to iris, voice, fingerprint recognition and more.

Technologies exist for capturing such biometric data. For example, smart phones have been adapted to include fingerprint scanners. However, the use of biometric authentication has not been widely adopted for use with highly sensitive applications where there is a strong need for security eg the banking industry. One reason for this is that the current banking system and all its infrastructure is geared towards the use of PIN-based authentication. A shift towards biometric authentication would require a very significant investment of time, effort and money to change or replace the existing hardware and software platforms. Another reason is that biometric data may be compromised. For example, there have been cases where fingerprints have been 'lifted' and replicated by third parties. This poses a serious security risk, and while a compromised PIN can be changed, an individual cannot change their fingerprint, voice or iris pattern.

Therefore, it is desirable to provide a solution which combines the convenience of use that biometric authentication offers with the security and logistical advantages of PIN-based authentication.

SUMMARY

Such an improved solution has now been devised.

Thus, in accordance with the present invention there is provided an authentication solution as defined in the appended claims.

The invention may provide an authentication method comprising the step: using biometric data relating to a user (of an electronic device) to provide an encoded or decoded version of an identifier.

Additionally or alternatively, the method comprise the steps: capturing biometric data relating to a user;

using the biometric data as input to a software-implemented component which is arranged and configured to use the biometric data to encode an identifier associated with the user such that the biometric data is required to decode the identifier.

The user's biometric data may be used as, or serve as, a key for encoding the user's identifier. Additionally or alternatively, it may be used or serve as a key for decoding it.

The identifier may be associated with the user, and/or a resource associated with the user. The resource may be, for example, a payment card such as a debit or credit card, or a financial account. The invention is not limited with regard to the type of resource which the identifier is related to. The resource may be a physical resource or an electronic, digital or virtual resource.

The identifier may comprise any type, length or format of identifier. For example, it may comprise numerical digits, letters, pictures etc or any combination thereof. Preferably, the identifier is pre-selected (ie determined prior to the authentication process) and stored in memory on a server. The server may be located at, operated by or on behalf of, a financial institution.

The biometric data may be any type of data relating to the physical and/or behavioural attributes of the user. It may comprise data relating to the user's fingerprint(s), iris pattern, voice, writing, veins or any other biometric source. In this document, the phrase "biometric data" may be used to mean data which is captured directly from the user (i.e. "raw" biometric data such as may be captured by a sensor). Additionally or alternatively, it may mean biometric data which has been derived from a biometric capture process. For example, it may be processed data which has been obtained or derived following a biometric authentication process. This may be a cryptographic key which has been generated during a biometric authentication process, or a registration process involving the capture of the user's biometric data.

Preferably, the biometric data is generated at or on an electronic device operated by the user. The electronic device may be referred to as a 'local' device. Preferably, the electronic device is a handheld, portable or mobile electronic device. It may be a smart phone, laptop or tablet computer, for example. It may comprise wireless communication capabilities for the transmission of data over a local network, close proximity protocol or wide area telecommunications network.

Preferably, the electronic device comprises hardware and/or software capabilities to enable the capture and generation of the biometric data, or is in physical or wireless communication with such a biometric data capture device eg fingerprint scanner, camera, voice recognition software etc. For example, the electronic device may be a smartphone having a camera and voice recognition software, or a finger print scanner built in. Additionally or alternatively, it may comprise an interface to allow the phone to connect to, for example, a scanner.

The biometric data may comprise, or may be processed to provide, one or more strings, arrays or sequences of values. The one or more strings, arrays or sequences of values may be used as, or may be process to provide, a keypad configuration. The keypad configuration may be a scrambled or randomized keypad configuration. The order of keys in the configuration may be scrambled relative to a default or reference keypad configuration eg the default configuration for the local device.

Thus, the biometric data capture device may produce or comprise a series of values, or the output of the biometric device may be processed to provide the series of values. Those values may be used as the labels assigned to keys in a keypad or keypad image. Thus, the biometric data may be used as, or to specify, a keypad configuration. Hereafter, the series of values may simply be referred to as an array. The array may be a portion or substring of the biometric data. The invention is not to be limited in respect of the data type, length or format of the biometric data or the array(s) generated from the biometric data.

The biometric data may be provided to a keypad generation component (KGC). The KGC may be a component provided on the local device or in communication with the local device. It may be a software application. The keypad generation component may be arranged to generate a Pin Entry Device (PED).

The biometric data may be used as input into a software component provided either on a handheld device operated by the user or on a remote computing resource such as a server. The software component may be arranged to use the biometric data to encode the identifier, or to use it as a seed for an algorithm arranged to generate a keypad configuration and/or a PED. The software component may be arranged to perform an encryption and/or randomization process.

Additionally or alternatively, some other form of data may be used as the input to the keypad configuration algorithm. This data may be derived from or in some way related to the user's biometric data. It may be, for example, a cryptographic key. The cryptographic key may be used to generate the seed. The key may be a private or public cryptographic key which is associated with a user and/or a digital wallet associated with a user. The wallet may be stored on the electronic device. The cryptographic key may have been generated during a biometric authentication process, or a registration process involving the capture of the user's biometric data.

Preferably, the encoding and/or decoding process may be performed using an altered or randomised keypad configuration, although any suitable encoding/decoding method could be used which is dependent upon the biometric data.

In one or more embodiments, the method may further comprise the step of using the biometric data to generate at least one operable keypad and/or at least one keypad image. The layout of the at least one operable keypad and/or at least one keypad image may be determined using the biometric data or a portion thereof. Therefore, the biometric data may serve as or be used to supply the keypad configuration for the operable keypad and/or image. The keypad/image generation step may be performed by the KGC which may be arranged and configured to receive the biometric data and process it to provide the one or more operable keypads, and/or one or more keypad images.

Preferably, the arrangement or configuration of keys in the operable keypad is different relative to the arrangement or configuration of keys depicted in the keypad image. The operable keypad is a functional keypad comprising a plurality of keys, each key having a value or symbol associated with it upon creation of the keypad, such that when a key is selected its associated value is placed into memory. The keypad may be an object generated electronically. It may provide a model or representation of a mechanical keypad. The keypad object may be generated using a subroutine (procedure, function or method) call. The subroutine may use parameters to determine the arrangement (order, position) of keys in the keypad. Upon execution of the procedure or method, the keypad object may reside in volatile memory until it is discarded. The operable keypad may be or comprise an event handler (or "event listener" in some alternative programming terminologies). The event may be a keyboard event, a touchscreen event or some other input-related event.

By contrast, the keypad image may be a representation of a keypad and devoid of functionality in itself. Therefore, in the absence of an operable keypad, the user is not able to input any values into memory by selecting the 'keys' depicted in the image. In one or more embodiments, one or more keys depicted in the image may be colour coded, watermarked or otherwise tagged to provide a visual assurance to the user that the image has been provided by a legitimate source.

As the arrangement of keys in the operable keypad is preferably different relative to the arrangement of keys depicted in the keypad image, the type, order and/or position of the operable keys does not correspond exactly to the type, order and/or position of the 'keys' depicted in the image. The keys in either the operable keypad or the keypad image may be scrambled relative to a reference keypad. As the order of keys in the operable keypad is preferably different to the order of keys depicted in the image, a mapping may be generated between the operable keypad and the image. This mapping may be used to encode and/or decode the identifier.

Preferably, the at least one operable keypad and/or at least one keypad image are provided within a display zone of the electronic device used to capture or generate the biometric data. The display zone may comprise a portion of a touchscreen. Advantageously, they are provided within the same display zone such that the keypad image superimposes or masks the operable keypad which underlies the image. Thus, the keypad(s) and/or image(s) may be generated by procedure calls; the image may be presented such that it blocks or obscures the keypad from the user's view at least partially but preferably completely. Therefore, the user may see what they believe to be a keypad and may select eg by touching what they believe to be an operable key with a given value, while in reality they are simply touching a portion of an image. By 'selecting' a portion of the image, however, the user may cause an operable key of the keypad to function, and thus the value that is placed into memory by the operable keypad may not correspond to the value that the user intended to input. Therefore, an encoded version of the user's identifier may be generated due to the mapping between the keys in the keypad and those depicted in the image. An advantage of this is that the user's 'real' identifier is never placed into memory on the local device. Therefore, it cannot be accessed by an unauthorised third party who has managed to compromise the local device.

This encoding aspect of the invention may be substantially as described in WO 2014/013252 which discloses an authentication solution wherein an image of a scrambled keypad is superimposed over an operable keypad to provide an encoded version of an identifier. However, in accordance with the present invention the keypad(s) and or image(s) may be generated at or on the local device using biometric data.

Thus, the at least one operable keypad and/or the at least one keypad image generated using the user's biometric data may be used to provide an encoded version of the user's identifier. The encoded version of the identifier may be transmitted from the local device to a remote device (eg server) where it may be stored. It may be stored in secure storage. It may be transmitted wirelessly.

The keypad image may be generated such that one or more of the keys depicted in the image are colour coded, tagged or otherwise marked (in addition to the value associated with the key). As the biometric data ensures that the same array package and therefore the same image may be generated each time, the marked keys may provide a visual reassurance to the user that the image they are viewing is legitimate rather than the result of unauthorised activity on the local device. For example, the user may expect that the key in the top left corner of the image is coloured yellow and the middle key on the bottom row of the keypad image is coloured red. If this is not the case then the user may suspect that the image has been provided by an unauthorised party.

The identifier may be encoded as part of a registration process wherein a user registers to use an embodiment of the invention. The encoding may be performed only once in respect of the same identifier. The registration process may comprise the capture of non-biometric data relating to the user, and/or data relating to a resource associated with the user eg a credit card number. In the event that the user changes the pre-stored version of the identifier (eg via their financial institution), an encoded version of the user's new identifier may be provided using the process described above and may be stored in place of the previously encoded version.

The biometric data may be used to determine the configuration of keys in the operable keypad and/or the configuration of keys depicted in the keypad image. This may be achieved by using the biometric data as input into the procedure, function or method call(s) used to generate the at least one operable keypad and/or the at least one keypad image. The procedure or method call(s) may form part of the keypad generation component. The keypad configuration component may generate the keypad(s) and image(s) on or at the local device. The biometric data may be used to provide one or more arrays of values, each array corresponding to a keypad configuration for creation of a keypad or image. The biometric data may be processed to provide the one or more arrays.

A plurality of operable keypads may be generated by the keypad generation component. Additionally or alternatively, a plurality of keypad images may be generated. The configuration of keys in each keypad or image may be different from the others in the respective plurality. One keypad and/or image may be designated as the 'active' keypad or image at any given time. For example, one keypad image may be used during an authentication session while a different underlying keypad may be used per keystroke received from the user. In some embodiments, one mutable keypad may be used and the state of the keypad may be altered so as to provide a different configuration of keys. Additionally or alternatively, the underlying operable keypad may remain the same during the authentication process while the keypad image may change.

At a minimum, one operable keypad or one keypad image is generated on the local device using the biometric data to determine its configuration. Additional configuration data and/or images may be sent to the local device from a server. For example, the biometric data may be used to generate an operable keypad at the local device and the keypad then superimposed with a keypad image received from a server. Alternatively, the keypad configuration data may be received at the local device from a server while the image is generated on the local device using the locally captured biometric data. However, in a preferred embodiment, the image(s) and keypad(s) may all be generated at the local device. This is advantageous because it eliminates the risk of the configuration data being intercepted during transmission to the local device, and because it transfers the processing burden from the server to the local device.

As an individual's biometric data does not change, the same encoded version of the identifier and/or keypad configuration will be generated each time a given user uses the invention. Another advantage is that as the user's biometric data can be used to determine the mapping between the keys in the operable keypad and the keys depicted in the keypad image, the user's biometric data becomes the 'key' for decoding the encoded version of the user's identifier. A further advantage is that as the user's biometric data can always be captured or re-generated, it does not need to be stored. Thus, once the encoded version of the identifier has been created and stored, it can always be decoded upon supply of the user's biometric data. This avoids the need for the user to carry any additional authentication devices, such as hardware tokens, or remember any further information in order to decode the identifier. The user always carries the key to unlock the identifier. The invention therefore provides a multi-factor authentication solution which requires biometric data (who the user is) and an identifier (something the user knows). When the identifier relates to a resource eg the user's payment card (something the user has) this provides a three-factor authentication solution.

The method may also comprise the step of using biometric data relating to the user to compute a decoded version of the encoded identifier. This decoding step may be performed following the registration process described above during which the encoded version of the user's identifier may be generated and stored. The decoding step may be performed as part of an authentication session initiated when the user wishes to gain access to a controlled resource or service, or perform a transaction. The decoding step may also be performed during the registration process to verify that the user's inputted identifier is correct ie matches a pre-stored version of the identifier.

The biometric data used to decode the encoded identifier may be captured separately from and subsequently to the biometric data used to produce the encoded version. Computing the decoded version may involve the use of one or more strings, arrays or sequences of values generated from biometric data relating to the user. The decoding may be performed by or at a server. The decoding may be performed within a HSM associated with a server.

The decoded version of the identifier may be verified in relation to a previously stored version of the identifier. The previously stored version may be stored by an institution or party associated with a payment card. The verification may be performed by sending a payment message or balance enquiry to a financial institution. Verification of the identifier may be successful if the decoded version of the identifier matches the previously stored version, and unsuccessful if it does not match.

Advantageously, only the user's biometric data is required in order to decode the identifier. Re-input of the user's identifier is not required. Neither is generation of the image or operable keypad required again. Preferably, after the encoded version has been stored (and optionally verified) on a remote device, eg server, the user may only need to re-input their biometric data eg swipe finger so that the arrays may be re-generated and transmitted to the server for decoding of the identifier. The arrays may enable the server to know the mapping between the configurations of the reference keypad and the keypad and/or image generated using the biometric data. Also advantageously, the biometric data and the arrays generated from it do not need to be stored. This provides a more secure solution as the key to decode the identifier cannot therefore be accessed from storage.

Also in accordance with the invention, there is provided an authentication system arranged and configured to implement any embodiment of the method described above. Such a system may comprise an electronic device arranged and configured to encode an identifier using biometric data relating to a user of the device.

The biometric data may be generated at or on the electronic device. The electronic device may be a handheld, portable or mobile computing device. The device may be arranged and configured to generate one or more strings, arrays or sequences of values from the biometric data.

The device may be arranged to implement the encoding process described above or any other encoding process that uses the biometric data to serve as a key. It may be arranged to use the biometric data to generate or specify a keypad configuration. The keypad configuration may be used to generate at least one operable keypad and/or at least one keypad image. The configuration of keys in the operable keypad may be different relative to the configuration of keys depicted in the keypad image; and/or the at least one operable keypad and/or at least one keypad image may be provided within a display zone of the electronic device used to capture or generate the biometric data.

The biometric data may be used to determine the configuration of keys in the at least one operable keypad and/or the configuration of keys depicted in the at least one keypad image. The at least one operable keypad and/or the at least one keypad image may be used to provide an encoded version of the identifier. The system may comprise memory for storage of the encoded version of the identifier; preferably wherein the memory is provided on or at a server.

The at least one keypad and/or at least one keypad image may be generated using at least a portion of the biometric data as input into a method or procedure call. The at least one operable keypad may be at least partially masked or obscured from the user's view by the at least one keypad image.

The system may comprise a further device arranged to compute a decoded version of the encoded identifier using biometric data relating to the user. Computing the decoded version may involve the use of one or more strings, arrays or sequences of values generated from biometric data relating to the user. The system may be arranged to verify the decoded version of the user's identifier in relation to a previously stored version of the identifier.

The invention may provide an authentication method comprising the steps of:
  generating an operable keypad or keypad image more than once, wherein the configuration of keys in the keypad or image are altered relative to a reference configuration of keys; and
  colour coding or otherwise altering one or more pre-selected keys in the keypad or image such that the same key or key position is always altered in the same way each time the keypad or image is generated. This aspect, as described above, may provide an assurance to a user that the keypad and/or image has been generated by a legitimate source.

It should be noted that any feature described above in relation to one aspect or embodiment of the invention may also be used to advantage in relation to any or all other aspects or embodiments. For example, a feature described in relation to a method of the invention may also be applicable to a system or apparatus in accordance with the invention, or vice versa.

These and other aspects of the present invention will be apparent from and elucidated with reference to, the embodiment described herein.

An embodiment of the present invention will now be described, by way of example, and with reference to the accompanying drawings.

DETAILED DESCRIPTION

An illustrative embodiment of the invention will now be provided in relation to the banking industry. It also uses an encoding process which involves the use of a randomised keypad and/or keypad image generated at least in part using the biometric data. However, it should be noted that the invention is not limited in these respects.

A method according to one embodiment of the invention comprises a two-step process. The first step comprises a registration process which is used to generate and store an encoded version of a user's identifier. The identifier could be any type of code or password associated with the user. The user's biometric data is used to generate the encoded version. Following registration, the user's biometric data is used to decode the encoded version of the identifier each time the user wishes to authenticate with a service or system. Therefore, the user's biometric becomes the key to unlock the encoded version of the identifier. The user's biometric data does not need to be stored but can be captured upon demand when required. This provides a more secure but convenient authentication arrangement, which does not require alteration of existing infrastructure.

Figure 4:
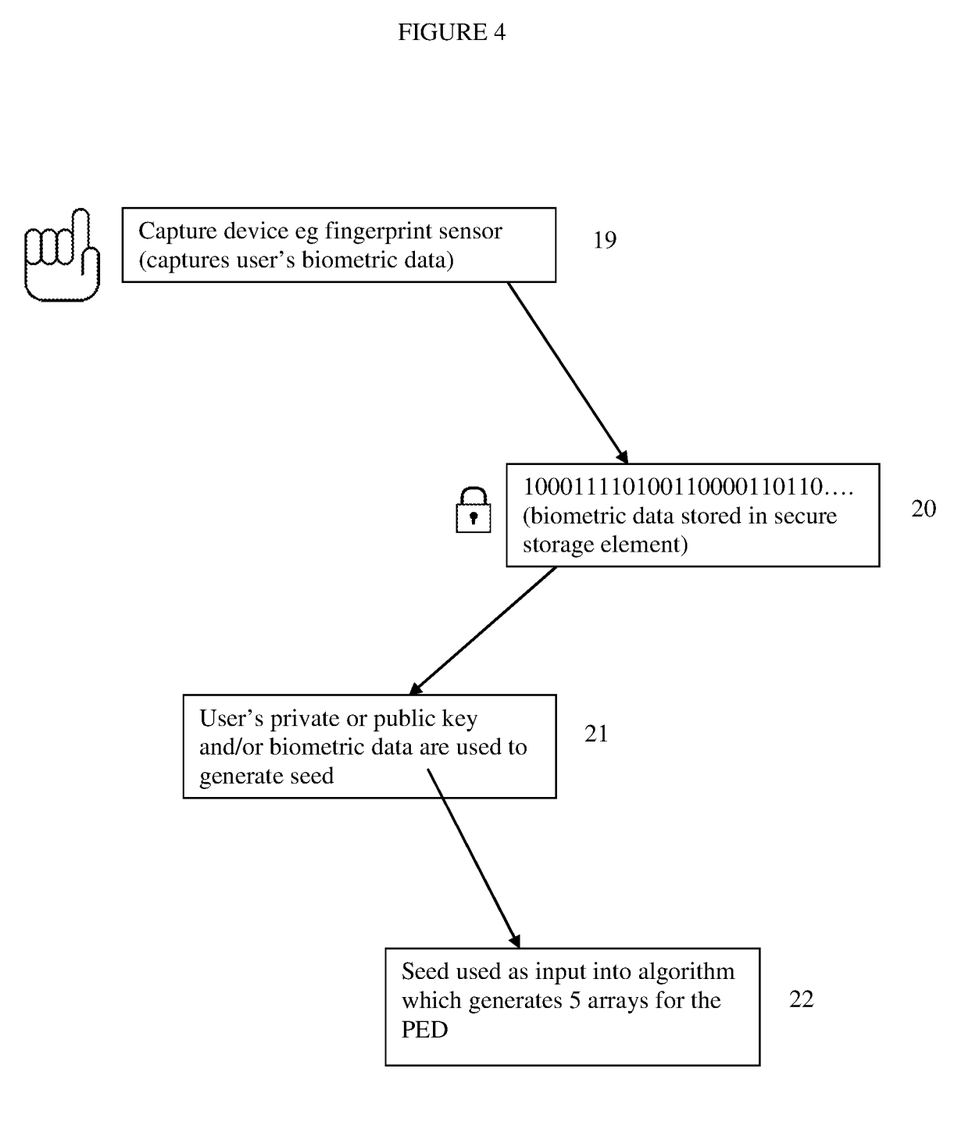
FIG. 4 shows an overview of at least some of the steps which may be used in accordance with an embodiment of the invention.

FIG. 4 shows an overview of at least part of the process of the present invention. As shown, a user's biometric data (eg fingerprint) is captured by a capture device 19. This is stored in a secure storage element on the user's device 20. The biometric data and/or the user's private key are used to generate a seed 21. The seed is used as input into an algorithm which generates a number of arrays which can be used to generate a PED 22. Thus, the PED generation is dependent upon the user's unique biometric data.

Registration Process

Figure 1:
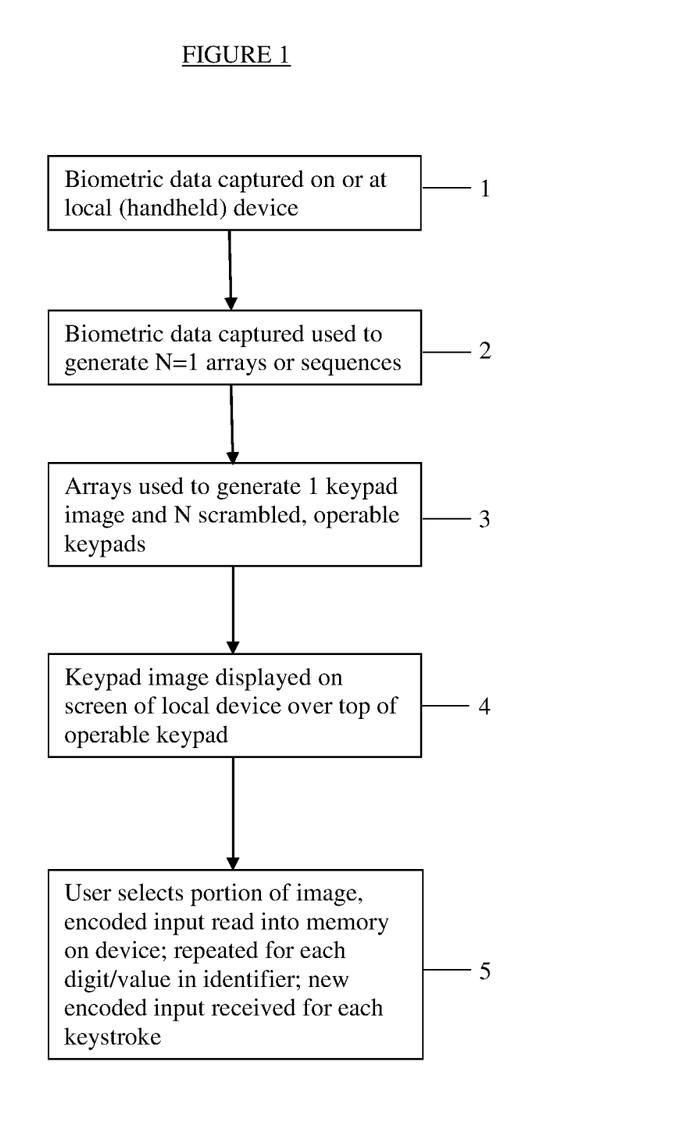
FIG. 1 is a flowchart showing the process of using biometric data to generate an image and a plurality of keypads to capture a user's keystroke, in accordance with the invention.

The user is required to register with the system before first use. Part of the registration process is shown in FIG. 1.

During registration the user may need to supply data such as name, address and data relating to one or more payment cards. This data may be stored on a remote device such as a server, or on the user's (local) device. The local device may be any type of computing device such as a mobile phone, laptop computer, PC, tablet computer. The registration data may be stored in a digital wallet provided on the local device. As is known in the art, the wallet may comprise or be associated with a cryptographic private/public key pair. The key pair may have been generated during set up or registration of the wallet using a biometric capture process.

The local device either includes or is in communication with a biometric capture device. Various types of capture device are known in the prior art and the invention is not limited with regard to the type of data that is captured or the type of device used to capture it. The following example refers to fingerprint data and fingerprint scanners but other types of biometric data and their respective capture devices may be used instead or additionally.

The fingerprint scanner is used to capture the user's biometric data 1. This is then fed into a Keypad Generation Component (KGC) provided on the local device. The KGC may be a software application which is downloaded to the local device for installation from a remote source such as a cloud-based server. The biometric data is provided to the KGC as an input string. The string can be used to provide one or more arrays of values 2, each array (or part/element thereof) capable of serving as input to a procedure call. The arrays may be substrings of the String produced from the biometric capture step 1. In a preferred embodiment, the KGC processes the biometric input string to generate a package of N+1 arrays wherein N is the number of digits in the user's identifier 3. The additional array can be used to generate a keypad image. Each array specifies the order (ie configuration) of keys in the image or keypad. These arrays may be stored in secure temporary storage.

In step 3, the KGC takes the input string and uses it to make a plurality of procedure calls. The first procedure call is to an image generation procedure which takes one array (ie part of the input string) and generates an image of a keypad. Thus, the biometric data is used as the parameters to the procedure call. The parameters dictate the configuration of keys depicted in the image. The term 'configuration' may relate to the position, order and/or arrangement of the 'keys'. The image is then displayed within a display zone of a screen associated with the local device. In this example, the local device is a smart phone having a touchscreen although a PC, monitor and mouse may be used to equal effect.

The image is created such that it resembles the style of a (default) keypad associated with the local device. However, in one embodiment the keys depicted in the image are scrambled relative to the device's default keypad. In other embodiments, the image may depict a non-scrambled keypad.

In one or more embodiments, the keypad image is arranged such that one or more keys are colour coded or otherwise tagged, marked or identified (besides the value associated with the key). This enables an image that is visually unique to the user to be generated. For example, certain keys can be given a background colour. This can be used as a visual reassurance to the user that the image they are seeing is from a legitimate source rather than something presented by an unauthorised party that has compromised the local device.

The KGC also makes one or more calls to a keypad generation procedure using one or more other portions of the biometric data as input. In a preferred embodiment, a plurality of operable keypads is generated, one keypad for each value or digit in the user's identifier.

An operable keypad is generated by the procedure and provided within the same portion of the screen as the image. Preferably, the image covers the keypad completely so that the user is unable to see the operable keypad due to the image that superimposes it 4. The configuration of keys in the operable keypad is different from the configuration of keys depicted in the image. At least one key is in a different position, although preferably more than one or all positions are different. Therefore, there is a mapping between the keys in the operable keypad and those depicted in the image. This mapping is dictated or at least influenced by the biometric input and therefore the encoding and subsequent decoding is dependent upon the biometric input.

In one embodiment, the image may depict a non-scrambled keypad while the keys in the underlying operable keypad are scrambled. In another embodiment, the image may depict a scrambled keypad while the keys of the underlying operable keypad are not scrambled. In yet another embodiment, both the keys depicted in the image and the keys of the operable keypad are positionally scrambled.

The user enters the first digit of their identifier which is associated with the payment card that they are registering, by 'selecting' the first digit on the screen 5. However, as the image comprises no keypad functionality in and of itself, and as the image is masking the operable keypad which is monitoring the screen for input, the user causes a key of the hidden keypad to operate. The value associated with the operated key is placed into memory on the local device 5. Thus, the value that is actually stored by the keypad may not correspond to the value that the user "selected" in the image. An encoded version of the input has been generated and can only be decoded if the mapping between the keypad and image configurations is known.

This input process (step 5) is repeated for each digit in the user's identifier so that a complete encoded identifier can be constructed in memory by concatenating each input to the previous inputs 6. In one embodiment, only one mutable keypad is generated but the configuration of keys is altered during the process. Arrays derived from the biometric input are used to alter the state of the keypad. In another embodiment, the underlying keypad is replaced for each keystroke so a new keypad with a different configuration is used for each input. Thus, the keypad generation procedure may be called more than once, each call using a (different) array of values derived from the biometric data. In some embodiments, the image may be replaced during the input process. In some embodiments the biometric data may be used to specify the scrambled configuration of only the operable keypad, or only the image. In other embodiments it may be used to scramble the configurations of both the displayed image and the hidden keypad.

As the same user will always provide the same biometric data, the same string and therefore image and/or keypad configuration(s) will always be generated.

Figure 2:
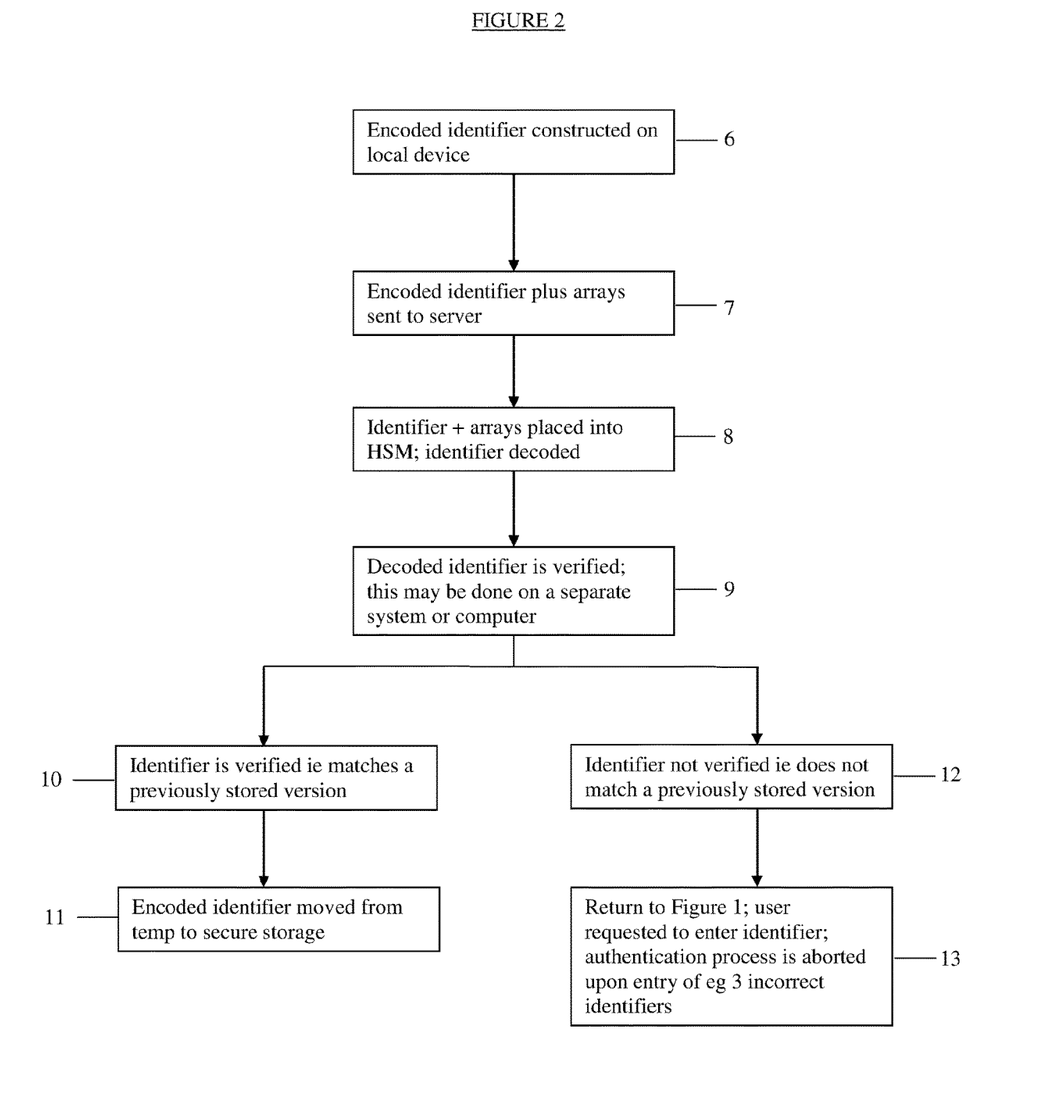
FIG. 2 shows part of the registration process in accordance with an embodiment of the invention.

Turning to FIG. 2, when an encoded version of the user's complete identifier has been constructed 6, it is stored in secure storage on the user's device along with the N+1 arrays that were used to create it. A copy of the encoded identifier and arrays is sent to a server 7 and passed to a Hardware Security Module (HSM) 8. The HSM is located remotely from the local device, at a server. Where the identifier is associated with a card such as a credit or debit card, it is necessary to check that the identifier entered by the user is the correct one for the card. Therefore, it must be verified with the card's issuing institution.

To perform the verification, the encoded identifier is decoded using the array package that was used to create it 8. This decoding is possible because the array package provides the mapping between the image and keypad configurations. The un-encoded version of the identifier is then stored in the HSM, and is used to generate a PIN block. The PIN block is used to send a payment message to an acquiring institution which then relays it to the card's issuing institution 9.

If the identifier is not correct 12 (ie does not match the identifier stored in association with that card by the issuing institution) the issuing institution will respond with a message indicating this. The user can then be asked to re-enter his identifier and the process described above is repeated. If three incorrect identifiers are inputted, the registration process may be aborted 13.

If, however, the issuing institution indicates that the identifier is correct 10, the encoded version of the identifier is moved from temporary storage to secure storage 11. The temporary storage is then erased.

It should be noted that the identifier can be verified in a variety of ways. In one embodiment, a balance enquiry can be can generated at the server and sent to issuing institution over the ATM network.

When the registration is complete, an encoded version of the user's identifier for a given card has been generated and securely stored. As the encoding was performed using a mapping generated from the user's biometric data, the biometric data is the key required to unlock or decode the identifier. The array package does not need to be stored anywhere, either at the local device or on the server, as it can be generated upon demand by re-capturing the user's biometric data. Similarly, the user does not need to re-enter the identifier during subsequent authentication sessions because the encoded version has been securely stored on the server. Therefore, only the array package needs to be generated during subsequent authentications and sent to the server so that the previously stored, encoded identifier can be decoded. This provides a secure and convenient authentication solution.

Authentication after Registration

Figure 3:
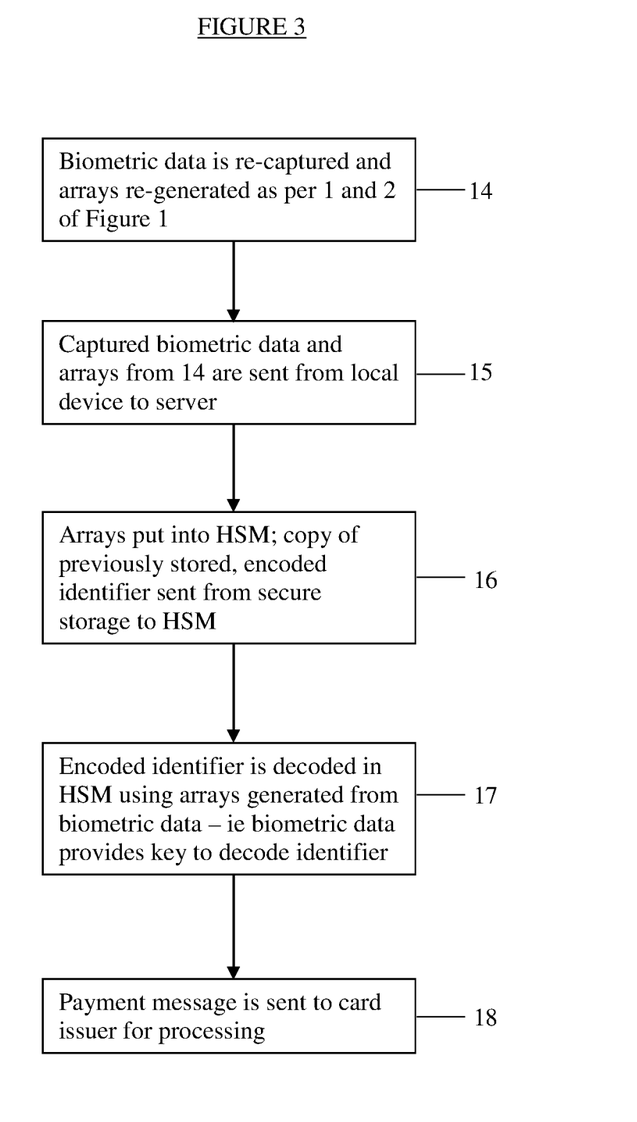
FIG. 3 shows part of a post-registration process in accordance with an embodiment of the invention.

As shown in FIG. 3, after registration, when the user wishes to perform a transaction using the registered payment card, the card is selected from the digital wallet on the local device. He scans his fingerprint 14. The string generated from the biometric capture is fed as input into the KGC as above. The N+1 arrays are generated and sent to the server 15 where they are placed into temporary storage. The previously verified, encoded identifier is retrieved from secure storage 16. The encoded identifier and arrays are put into the HSM 16 where the arrays are used to decode the identifier 17. The identifier and card details (which are retrieved from the wallet or entered when required by the user) are sent with the transaction amount to an acquiring institution e.g. bank as a payment message 18. The acquiring institution then relays the message to the issuing bank which will process the transaction if the identifier is correct or decline it if the identifier is incorrect.

Thus, the decoding process does not require any input from the user other than the biometric data. The identifier does not need to be re-entered, and the keypad(s)/image(s) do not need to be re-generated.

In one or more embodiments, the encoding process may be performed by a different party from the decoding process. The identifier may be encoded using the biometric data and then supplied to another party and stored, in encoded form, on a further system or device. The other party then only requires the user's biometric data, which can be captured and supplied as required, to unlock the identifier.

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. In the present specification, "comprises" means "includes or consists of" and "comprising" means "including or consisting of". The singular reference of an element does not exclude the plural reference of such elements and vice-versa. The invention may be implemented by means of hardware comprising several distinct elements, and by means of a suitably programmed computer. In a device claim enumerating several means, several of these means may be embodied by one and the same item of hardware. The mere fact that certain measures are recited in mutually different dependent claims does not indicate that a combination of these measures cannot be used to advantage.

The invention claimed is:

1. An authentication method for a user comprising:
generating at least one keypad image that depicts a first plurality of keys with values or symbols associated therewith;
generating a mapping between the first plurality of keys and a second plurality of keys of an operable keypad, wherein the second plurality of keys of the operable keypad has values or symbols associated therewith, wherein the keypad image has a first keypad configuration that enumerates order or position of keys in the first plurality of keys depicted in the keypad image, wherein the operable keypad has a second keypad configuration that enumerates order or position of keys in the second plurality of keys of the operable keypad, wherein the first keypad configuration is different from the second keypad configuration, and wherein at least one of the first keypad configuration and the second keypad configuration is specified by biometric data relating to the user; and
using the mapping between the first plurality of keys and the second plurality of keys to provide an encoded version of an identifier associated with the user.

2. The method according to claim 1, further comprising:
generating the biometric data at or on an electronic device.

3. The method according to claim 2, wherein:
the electronic device is a handheld, portable or mobile computing device.

4. The method according to claim 1, further comprising:
using the biometric data as a decode key for decoding the identifier.

5. The method according to claim 1, wherein:
the biometric data comprises one or more strings, arrays or sequences of values.

6. The method according to claim 1, further comprising:
using the mapping to decode the identifier.

7. The method according to claim 1, further comprising:
storing the encoded version of the identifier.

8. The method according to claim 7, wherein:
the encoded version of the identifier is stored on a server.

9. The method according to claim 1, further comprising:
using at least a portion of the biometric data as input into a subroutine call, wherein the subroutine comprises instructions to generate the at least one of the at least one operable keypad and the at least one keypad image.

10. The method according to claim 1, further comprising:
verifying the identifier by comparing it to a previously stored version.

11. The method according to claim 1, further comprising:
sending the biometric data, or data derived from the biometric data, from an electronic device operated by the user to a remote computing resource to enable the encoded version of the identifier to be decoded using the biometric data or data derived therefrom.

12. The method according to claim 1, wherein:
the biometric data comprises, or is processed to provide, one or more strings, arrays or sequences of values that is used as a seed for an algorithm arranged to generate at least one of the first keypad configuration and the second keypad configuration.

13. The method according to claim 12, wherein:
the biometric data comprises a cryptographic key generated during a biometric authentication process or during a registration process involving capture of the biometric data relating to the user.

14. An authentication system for a user comprising:
an electronic device operated by the user; and
a remote computing resource,
wherein the system is arranged and configured to:
generate at least one keypad image that depicts a first plurality of keys with values or symbols associated therewith;
generate a mapping between the first plurality of keys and a second plurality of keys of an operable keypad, wherein the second plurality of keys of the operable keypad has values or symbols associated therewith, wherein the keypad image has a first keypad configuration that enumerates order or position of keys in the first plurality of keys depicted in the keypad image, wherein the operable keypad has a second keypad configuration that enumerates order or position of keys in the second plurality of keys of the operable keypad, wherein the first keypad configuration is different from the second keypad configuration, and wherein at least one of the first keypad configuration and the second keypad configuration is specified by biometric data relating to the user; and
use the mapping between the first plurality of keys and the second plurality of keys to provide an encoded version of an identifier associated with the user.

15. The system according to claim 14, wherein:
the biometric data is generated or captured at or on the electronic device.

16. The system according to claim 15, wherein:
the electronic device is a handheld, portable, or mobile computing device.

17. The system according to claim 14, wherein:
the system is configured to use the biometric data as a decode key for decoding the identifier.

18. An authentication method for a user comprising:
capturing biometric data relating to the user; and
using the biometric data as input to a software-implemented component which is arranged and configured to use the biometric data to encode an identifier associated with the user by:
generating at least one keypad image that depicts a first plurality of keys with values or symbols associated therewith;
generating a mapping between the first plurality of keys and a second plurality of keys of an operable keypad, wherein the second plurality of keys of the operable keypad has values or symbols associated therewith, wherein the keypad image has a first keypad configuration that enumerates order or position of keys in the first plurality of keys depicted in the keypad image, wherein the operable keypad has a second keypad configuration that enumerates order or position of keys in the second plurality of keys of the operable keypad, wherein the first keypad configuration is different from the second keypad configuration, and wherein at least one of the first keypad configuration and the second keypad configuration is specified by biometric data relating to the user; and
using the mapping between the first plurality of keys and the second plurality of keys to encode the identifier associated with the user.

19. The method according to claim 18, further comprising:
using the mapping between the first plurality of keys and the second plurality of keys to decode the identifier associated with user.

* * * * *